Patented Nov. 7, 1944

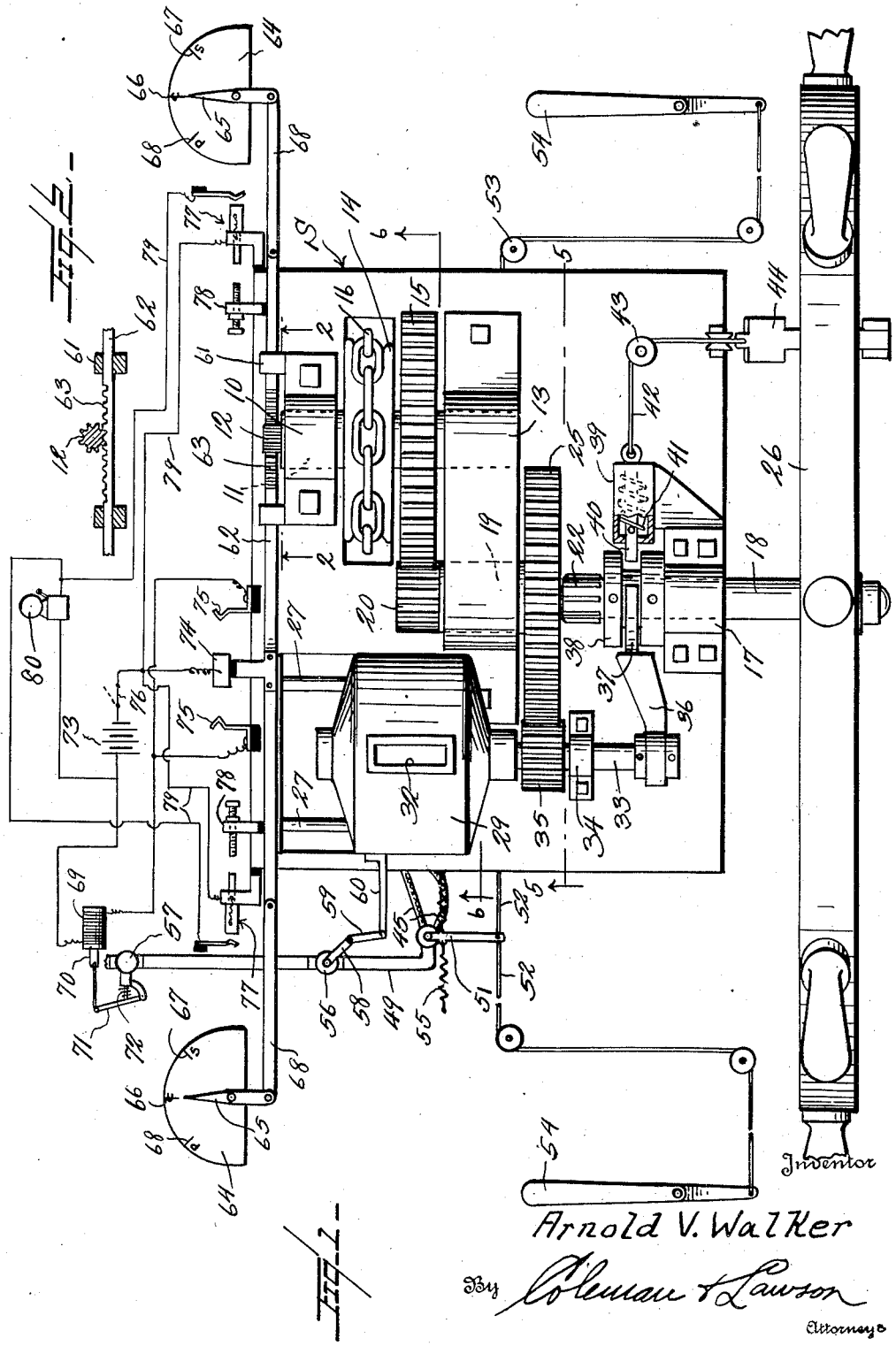

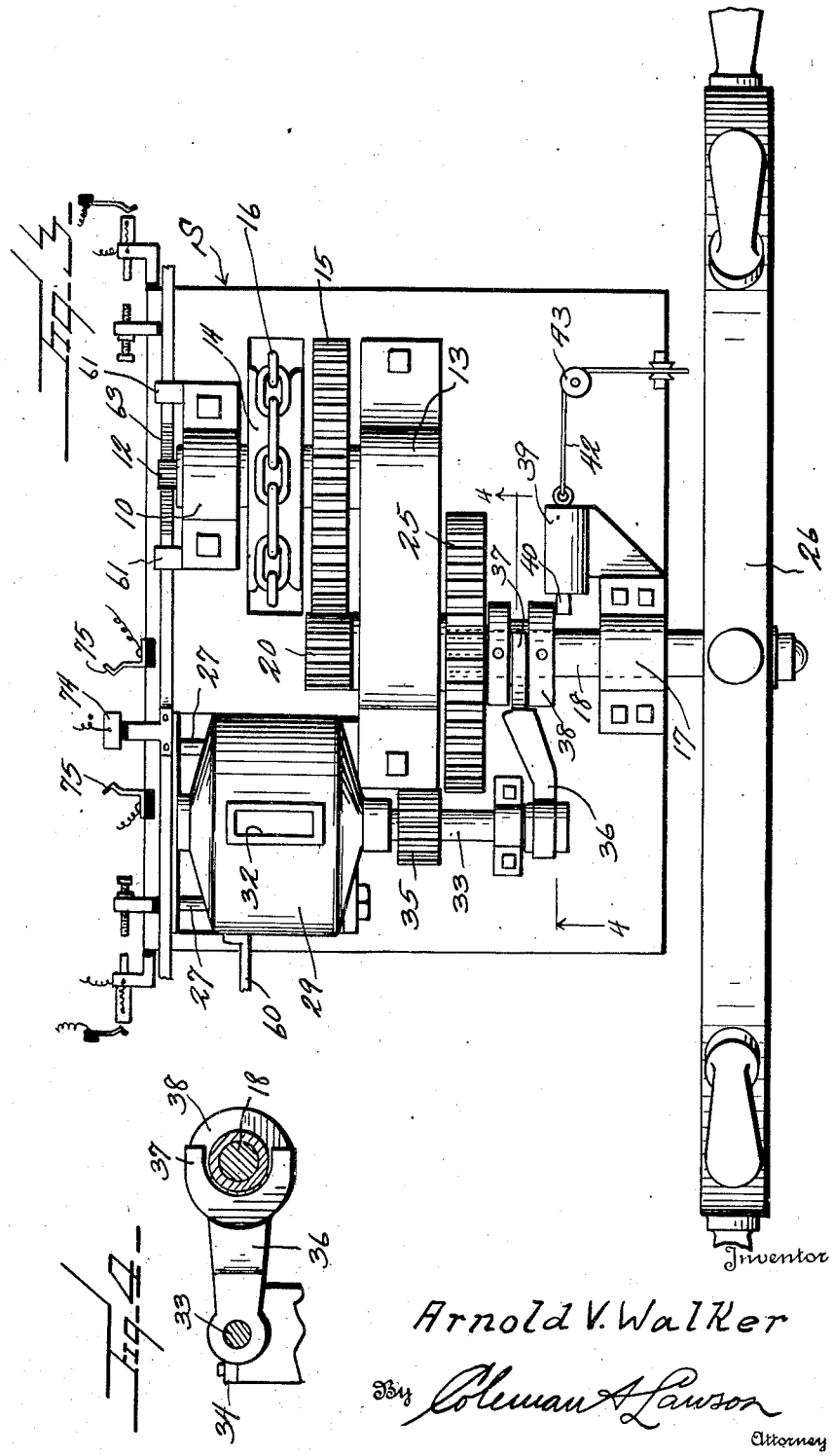

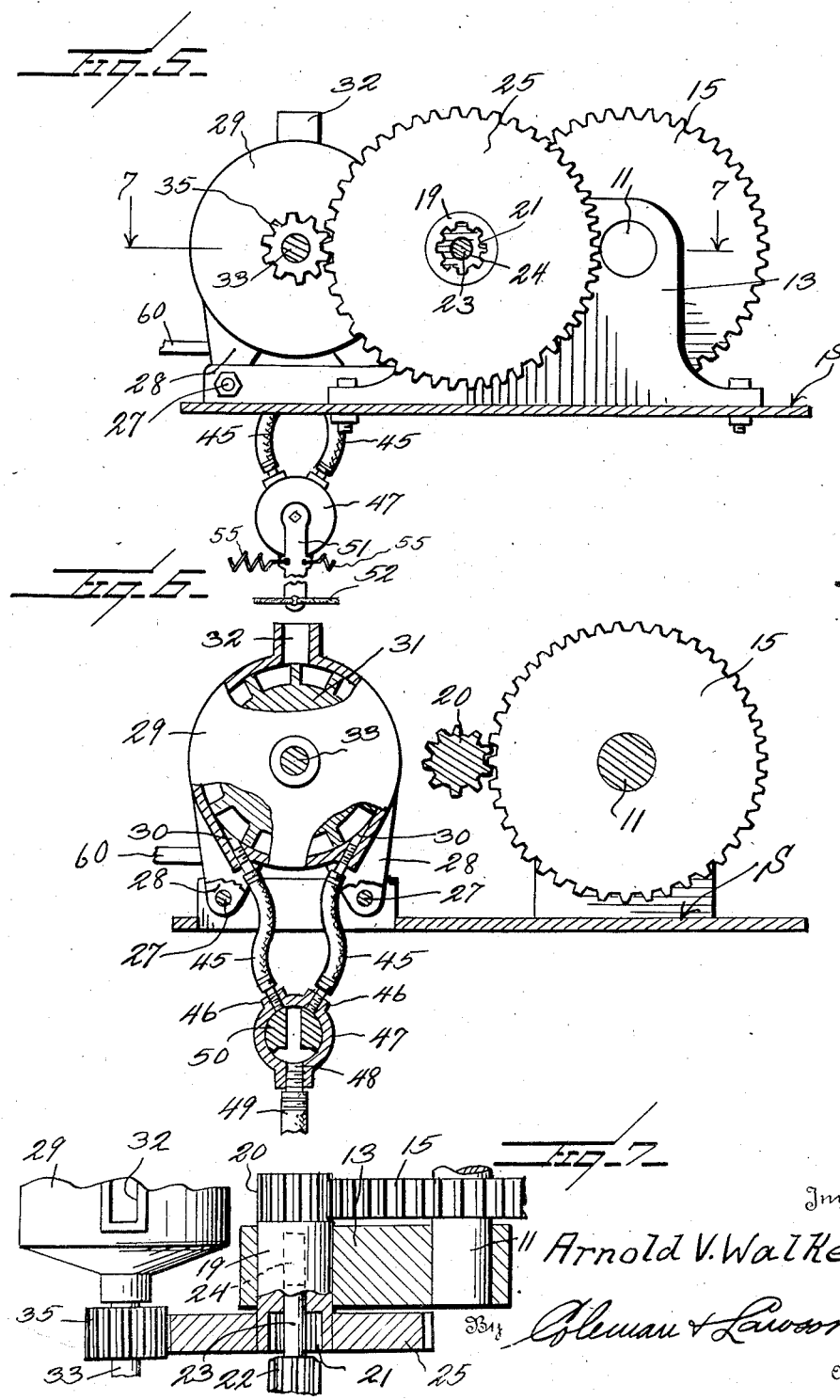

2,362,178

UNITED STATES PATENT OFFICE 2,362,178

HAND AND POWER STEERING MECHANISM

Arnold V. Walker, Pascagoula, Miss.

Application October 31, 1942, Serial No. 464,098

19 Claims. (Cl. 114—144)

This invention relates generally to the class of ships, and pertains particularly to improvements in steering mechanism therefor.

A primary object of the present invention is to provide a steering mechanism for a ship which may be actuated by hand or by power as desired, and which is so constructed that the hand and power operating portions or units of the mechanism may be readily thrown into and out of operation so that conversion from one to the other may be made rapidly as desired.

Another object of the invention is to provide a combination hand and power steering gear or mechanism in which the hand operated portion of the mechanism is shiftable into and out of working position and is so operatively coupled with the power actuated portion of the mechanism that the power operated portion will be moved synchronously into and out of working position with the movement of the hand operated portion.

Still another object of the invention is to provide in a combination hand and power steering gear, a fluid pressure operated motor which is under the control of a pair of hand levers by means of which the motor may be run clockwise or counterclockwise as desired to effect the turning of the ship's rudder for steering to port or starboard.

Still another object of the invention is to provide in a mechanism of the above described character, a safety control which functions automatically when the rudder is hard over to port or to starboard, to cut off the supply of power to the operating motor, whereby to prevent damage to the mechanism.

Another object of the invention is to provide in association with a steering gear of the character stated, a visual indicator for designating to the wheelman the direction of movement of the ship's rudder.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings:

Figure 1 is a view in top plan, and in part diagrammatic, of the mechanism embodying the present invention.

Figure 2 is a sectional view taken on the line 2—2 of Figure 1.

Figure 3 is a view in plan of the steering gear showing the parts arranged for hand steering as distinguished from the relation of the parts as illustrated in Figure 1 set for power steering.

Figure 4 is a sectional view taken on the line 4—4 of Figure 3.

Figure 5 is a sectional view taken on the line 5—5 of Figure 1.

Figure 6 is a sectional view taken on the line 6—6 of Figure 1.

Figure 7 is a sectional view taken on the line 7—7 of Figure 5, the gears being coupled for power operation.

Referring now more particularly to the drawings, there is shown in Figures 1 and 3 a supporting structure or base S representing a suitable portion of the ship structure upon which the principal operating units of the steering gear are mounted.

In accordance with the present invention there is provided a bearing 10 mounted upon the supporting base S, through which extends the forward end of a shaft 11 which carries, forwardly of the bearing 10, the pinion gear 12. The rear end of the shaft 11 is rotatably supported in one side of a double bearing 13 and between the two bearings the shaft 11 carries and has secured thereto a load chain sheave 14 and the spur gear 15.

Passing around the chain sheave 14 is a load chain 16 which is connected at its two ends with the rudder cables, not shown, of the ship.

Rearwardly of the double bearing 13 is the steering wheel shaft bearing 17 in which is rotatably and longitudinally slidably supported the steering wheel shaft 18.

Forward of and aligned with the steering wheel shaft 18 is a stub shaft 19 which is rotatably supported in the double bearing 13 in parallel relation with the shaft 11, as shown most clearly in Figure 7, and upon the forward end of this stub shaft is carried the pinion gear 20 which is constantly in mesh with the spur gear 15 and which is of a size to establish between the two gears a ratio of 4 to 1.

The rear end of the stub shaft 19 is formed to provide an internal spline 21 which slidably receives the external spline 22 formed upon the forward end of the steering wheel shaft 18, as shown in Figures 1 and 7. The forward end of the shaft 18 has the reduced extension or spindle 23 which slidably engages in a bore 24 formed axially in the stub shaft 19 to assist in maintaining this shaft and the shaft 18 in the proper alignment.

The stub shaft 19 carries upon its rear end the spur gear 25 which is selectively coupled with the power drive, as hereinafter described.

Upon the rear end of the shaft 18 is mounted a steering wheel 26 of usual construction and the wheelman or steersman is able through the medium of this wheel, when the splines 21 and 22 are operatively coupled together, to turn the shafts 11 and 19, and thus transmit steering movement to the ship's rudder through the load chain 16. When the hand steering wheel is not to be used it can be readily disconnected from the shaft 19 by pulling rearwardly upon the steering wheel 26 and the shaft 18 to thus separate the external spline 22 from the internal spline 21.

Disposed at one side of the shafts 18 and 19 are the two spaced parallel track bars 27 which parallel the shafts 18 and 19, as shown most clearly in Figure 1. Slidably supported upon these track bars is a carriage 28 which has mounted thereon the fluid operated motor 29 which is designed for operation by compressed air. The numeral 30 designates the two fluid pressure inlet ports through which compressed air or other suitable operating fluid may be introduced under pressure to the right or left hand side of the motor to drive the rotor 31 clockwise or counterclockwise as desired. The outlet or exhaust port for the motor is indicated by the numeral 32 and is located at the top of the rotor housing.

The rotor 31 is carried on the rotor shaft 33 which extends across the edge of the spur gear 25 and has sliding mounting in the rearwardly placed bearing 34.

Secured to the shaft 33 is a pinion gear 35 which is adapted for toothed connection with the spur gear 25, as shown in Figure 1, but which is disengageable therefrom when the motor 29 is shifted forwardly upon the supporting bars 27.

An operative coupling is maintained between the motor shaft 33 and the steering wheel shaft 18 whereby forward and rearward movement of the steering wheel shaft will impart corresponding movement to the motor so that when the steering wheel shaft is shoved forwardly to operatively couple the shaft with the stub shaft 19 the gears 25 and 35 will be uncoupled and, consequently, steering of the boat may be accomplished by hand alone. When the steering wheel shaft is pulled rearwardly to disconnect this shaft from the shaft 19 the motor 29, together with the shaft 33 and the pinion gear 35, will be moved rearwardly so that the gear 35 will operatively engage with the gear 25.

The operative connection between the shafts 33 and 18 is here illustrated as comprising an arm 36 secured at one end to the shaft 33 and extending toward the shaft 18 and terminating at its free end in the fork 37. Coacting with the fork 37 is the circumferentially grooved collar 38 which surrounds and is fixed to the shaft 18 and which has the fork 37 loosely engaged in the groove or circumferential channel of the collar, as shown. Since the collar 38 is fixed to the shaft 18 and the forked arm 36 is rigid with the shaft 33, it will be readily seen that longitudinal reciprocal motion of the shaft 18 will be transmitted to the shaft 33 so as to effect the shifting of the motor 29 in the manner previously described.

At one side of the collar 38 there is slidably supported in a suitable carrier box 39, the spring projected latch pin 40. Within the box and surrounding the pin is the control spring 41 which functions to constantly urge the latch pin toward the shaft 18, and when the shaft is pulled to the limit of its movement rearwardly this latch pin engages in the groove of the collar and holds the shaft against forward movement. When the pin is retracted against the tension of the spring 41, the shaft 18 may then be shifted forwardly, after which the pin when allowed to move out under the action of the spring 41, engages behind the collar 38, as shown in Figure 3, and then functions to maintain the shaft 18 in its forward position or in operative connection with the stub shaft 19 and to maintain the motor 29 in its forward or inoperative position.

Means may be provided whereby the wheelman may shift the latch pin 40 without releasing the wheel such, for example, as by attaching a pull cable 42 to the outer end of the latch pin and carrying the same over suitable pulleys 43 to a pivoted foot treadle 44, conveniently placed upon the floor.

Each of the inlet ports 30 for the motor 29 has a suitable length of flexible tubing 45 connected therewith, as shown most clearly in Figure 6, and the other end of these tubes are connected with the two outlet ports 46 of a three-way rotary plug valve which is indicated generally by the numeral 47 and which has the single inlet port 48 with which is connected a pipe line 49 leading from a suitable source of operating or driving fluid under pressure. The plug 50 of this valve has a control lever 51 coupled therewith, to the outer end of which lever is attached one end of each of two oppositely extending pull cables 52.

Each of the pull cables runs, over suitable pulleys 53, to a hand lever 54. These hand levers are pivotally mounted conveniently at opposite sides of the hand weel 26. In order that the hand levers 54 may be maintained in neutral position or returned to such position when released there are provided the control springs 55 which are connected to opposite sides of the valve lever 51. These springs are attached to a suitable fixed support, not shown, and oppose one another to thus hold the valve lever in inoperative position, as shown in Figure 6. Thus when either lever 54 is oscillated to actuate the valve one of the springs will be tensioned and function to restore the lever and valve each to its former position.

The power or operating fluid supply pipe 49 is provided with a main shut-off valve 56 in addition to the control valve 47 and, in addition to these two valves, there is a third valve 57 which functions as a safety shut-off in a manner hereinafter described.

The main shut-off valve 56 has the control lever 58 which is operatively coupled through the medium of a link 59 and an arm 60, with the motor 29, the arm 60 being attached to the motor, as shown in Figure 1. Thus when the motor is moved rearwardly to establish an operative coupling between the gears 25 and 35, the main control valve 56 will be opened and when the motor is moved forwardly to disconnect the gears 25 and 35 the main valve will be shut off or closed.

Forwardly of the bearing 10 are located guides 61 which are placed at opposite sides of the pinion gear 12 and these guides 61 support for shifting movement transversely of the shaft 11, the rack bar 62 which has teeth 63 operatively coupled with the pinion 12.

Adjacent the outer ends of the rack bar 62 are indicator dials 64 each of which has pivotally mounted at its center the pointer 65. Each dial has a center or neutral position marking 66 thereon with starboard and port markings 67 and 68 to the right and left, respectively, of the central or neutral position marking 66. The ends of the rack bar 62 are connected by links 68 with the pointers 65 and the position of the rack bar is so set that when the ship's rudder is on the keel line or in central position, the pointers 65 will indicate the center line or neutral position 66 upon the dial. Consequently, when the load chain sheave is turned in either direction during steering the pointers 65 will indicate whether the helm has been shifted to port or starboard.

Means is provided whereby, when operating the steering gear by power through the medium of the motor 29, the power supply will be cut off by the closing of the valve 57 in the event that the rudder is swung hard to port or hard to starboard. Such means comprises a solenoid 69 having an armature 70 which is operatively coupled by the linkage 71 with the spring controlled stem 72 of the valve 57. Through the medium of this spring controlled stem the valve 57 normally stands open and the armature 70 of the solenoid is held in its outwardly extended position.

The solenoid 69 is connected in circuit with a storage battery 73 or other suitable source of electric potential, a movable contact 74 supported upon the rack bar 62, and the two spaced fixed contacts 75 electrically connected upon the opposite side of the solenoid from the battery and the movable contact and between which the movable contact is shifted by the rack bar. These fixed contacts are so spaced that when the ship's rudder is moved hard to port or hard to starboard, as previously stated, the contact 74 will electrically connect with a fixed contact 75, thus closing the circuit and energizing the solenoid 69 which in turn retracts its armature 70 and effects the closing of the valve 57. This shuts off the supply of fluid pressure flowing to the motor 29, thereby stopping the operation of the steering mechanism.

By providing a hand switch 76 in the circuit with the solenoid and other electrical elements, the circuit may be opened by hand when desired so as to effect deenergization of the solenoid and cause the safety valve to open to resupply motive fluid to the motor 29.

If desired, a suitable signal means such as a light or bell may be set up in conjunction with the safety shut-off to give warning to the wheelman when the ship's rudder is about 3° from being hard over so that the wheelman may stop the swinging of the rudder further in the direction in which it is moving. Such signalling means may be in the form illustrated in Figure 1. This mechanism comprises two suitable switches 77 suitably disposed to be engaged, each by an adjustable screw finger 78 carried by the rack bar 62. These switches are disposed upon opposite sides of the gear pinion 12 and the operating fingers are set so that, upon being moved toward its adjacent switch 77 it will close the latter about 3° of rudder movement in advance of the electrical connection of contact 74 with a contact 75.

Each switch is in a circuit 79 and in each circuit is connected a signal 80, such as a bell or the like, and the source 73 of electric potential.

The wheelman, if he heeds the warning signal, will thus be able to prevent the rudder being moved hard over and avoid completely shutting off the power flow to the fluid motor and the necessity of having to open the switch 76 in order to set the power drive again in operation.

The switch 76 may be of the spring button type and located in a convenient position for actuation by the wheelman's foot.

From the foregoing it will be readily apparent that the steering gear herein disclosed provides a novel, easily convertible means of steering by hand or by power, wherein when the power steering means is in operation the hand steering means is completely disengaged and ineffective but may be easily and quickly thrown back into service when desired, at the same time throwing out of operation the power operating means. With this power steering means the wheelman will be able to readily control the rudder or hold the same in a desired position over a long period of time and during rough weather without the fatigue which would be attendant upon the performance of such a duty by means of the hand wheel.

I claim:

1. Ship steering mechanism, comprising a rotatable rudder cable sheave, a rotatable hand steering wheel, a rotary power driven unit, and means for selectively establishing an operating connection between the sheave and the hand steering and power driven units, and simultaneously disestablishing operating connection between the sheave and the non-selected unit.

2. Ship steering mechanism, comprising a rotatable rudder cable sheave, a rotatable shaft, a reduction drive coupling between the shaft and said sheave, a hand steering wheel, means for establishing driving connection between the steering wheel only and said shaft, a power driven rotatable unit, and means for establishing a driving connection between the power driven unit only and said shaft.

3. A steering mechanism as set forth in claim 2, with means operatively coupling the steering wheel and the power driven unit for effecting the coupling of the power driven unit with said shaft simultaneously with the disconnection of the hand wheel from the shaft and vice versa.

4. Ship steering mechanism comprising a rotatable rudder cable sheave, a gear coaxially connected with the sheave, a shaft, a pinion operatively coupling the shaft with said gear, a gear upon the shaft, a hand steering wheel shaft coaxial with the first shaft and movable axially with respect thereto, a steering wheel upon the steering wheel shaft, means for operatively coupling the steering wheel shaft with the first shaft upon axial movement of the steering wheel shaft in one direction, a rotatable power driven pinion adapted for connection with the second-mentioned gear, and means for moving said last-mentioned pinion into and out of operative connection with the said second-mentioned gear.

5. A steering mechanism as set forth in claim 4, with an operative connection between the steering wheel shaft and the power driven pinion by which the power driven pinion is moved into operative connection with the second-mentioned shaft upon movement of the steering wheel shaft in a direction to disconnect it from the first shaft and vice versa.

6. A steering mechanism as set forth in claim 4, with means for effecting the automatic stopping of the operation of the power driven pinion when the latter is operatively coupled with the second-mentioned gear upon rotation of the cable sheave clockwise or counterclockwise beyond a predetermined extent.

7. Steering mechanism as set forth in claim 4, in which the operative coupling between the steering wheel shaft and the first-mentioned shaft is accomplished through the medium of an internal spline formed in the end of the first-mentioned shaft and an external spline formed upon the adjacent end of the steering wheel shaft for sliding connection in the internal spline.

8. Steering mechanism as set forth in claim 4, with an operative coupling between the power driven pinion and the steering wheel shaft, comprising a rigid arm operatively connected at one end with the power driven pinion and extending laterally toward the steering wheel shaft, the arm terminating at its other end in a fork, and a circumferentially grooved collar encircling and secured to the steering wheel shaft and having said fork loosely engaged in the groove thereof whereby rotation of the steering wheel shaft is permitted independently of the arm and said steering wheel shaft when moved axially imparts movement through the arm to the power driven pinion on a path parallel with the rotary axis of the steering wheel shaft.

9. Ship steering mechanism, comprising a rotatable shaft, means for operatively coupling a rudder cable with said shaft, a second shaft paralleling the first shaft, a gear and pinion driving connection between the shafts, a gear upon the second shaft, a steering wheel shaft supported in axial alignment with the second shaft for rotation and for axial movement relative to the adjacent end of the second shaft, a detachable slidable coupling between the adjacent ends of the second shaft and the steering wheel shaft, a motor supported for movement along a path paralleling the steering wheel shaft and having a rotor shaft extending across the second-mentioned gear, a pinion carried upon the motor rotor shaft for operative connection with the second-mentioned gear, said rotor shaft pinion being movable into and out of connection with the second-mentioned gear upon shifting of the motor, a coupling between the rotor shaft and the steering wheel shaft by which, upon establishment of an operative connection between the steering wheel shaft and the second-mentioned shaft, the rotor pinion will be moved for disengagement from the second-mentioned gear and vice versa, and releasable means for securing the steering wheel shaft against axial movement.

10. Ship steering mechanism, comprising a rotatable shaft, means for establishing an operative connection between said shaft and a ship's rudder, a rotatable steering wheel shaft, a steering wheel mounted upon the shaft, a fluid operated motor, means for selectively establishing a driving connection between the first shaft, and the motor and steering wheel shaft, a valve controlling the flow of driving fluid to the motor for effecting clockwise or counterclockwise rotation of the motor, and a hand lever control means operatively coupled with said valve for effecting opening and closing of the same for selective clockwise or counterclockwise driving of the motor.

11. A steering mechanism as set forth in claim 10, with an indicator dial, a pointer oscillatably positioned for cooperative action with the face of the dial, said dial having port and starboard designations thereon and an intermediate center position designation, an operative coupling between the pointer and the first-mentioned shaft whereby upon rotation of the first-mentioned shaft during movement of the rudder by the mechanism the position of the rudder with respect to the port and starboard indications will be indicated upon the dial.

12. Steering mechanism as set forth in claim 10, including an automatic shut-off valve in the power fluid supply line for said motor, said automatic valve being normally open, a solenoid having an armature operatively coupled with said automatic valve, an electric circuit in which said solenoid is connected together with a source of electric potential, a pair of spaced fixed contacts and a movable contact interposed between the fixed contacts, and an operative connection between the movable contact and the first shaft by which the movable contact is brought into electrical engagement with one of the fixed contacts to close said circuit upon rotation of the first shaft beyond a predetermined extent and the shutting off of the supply of fluid power to the motor by the energization of the solenoid.

13. Ship steering mechanism comprising a rotatable shaft, means for operatively coupling the shaft with a rudder cable, a second shaft rotatably supported adjacent the first shaft, a reduction gear coupling between the shafts, a fluid driven motor supported for sliding movement on a path paralleling said shafts and having a rotor shaft, a reduction gear coupling between the rotor shaft and the second shaft, a steering wheel shaft supported in end aligned relation with the second shaft for rotational and axial movement, means for establishing an operative driving connection between the steering shaft and the second shaft upon forward movement of the steering wheel shaft, a steering wheel supported upon the steering wheel shaft, a connecting arm between the rotor shaft and the steering wheel shaft by which upon axial movement of the steering wheel shaft to establish connection between the same and the second shaft, sliding movement will be imparted to the motor through the rotor shaft to disengage the rotor shaft from the second shaft and vice versa, a releasable securing means for holding said steering wheel shaft in either driving or non-driving relation with the second shaft, a pressure fluid conducting pipe, valve means for selectively directing fluid from the pipe to either of two inlet ports for the motor for clockwise or counterclockwise driving of the motor, and hand lever means for controlling said valve.

14. Steering mechanism as set forth in claim 13, with a main control valve in said pipe and an operative coupling between the motor and the main control valve by which the main control valve is closed upon movement of the motor in a direction to effect the disconnection of the rotor shaft from the second-mentioned shaft.

15. Steering mechanism as set forth in claim 13, with a spring actuated normally open shut-off valve in said fluid pipe line, a solenoid having an armature operatively coupled with the spring controlled valve to effect closing of the latter upon energization of the solenoid, an electric circuit in which said solenoid is connected together with a source of electric potential, a pair of spaced fixed contacts and a movable contact interposed between the fixed contacts, and means operatively coupling the movable contact with the first-mentioned shaft whereby the movable contact is brought into electrical engagement with a fixed contact upon rotation of the first shaft beyond a desired extent to close the circuit and energize the solenoid.

16. A ship steering mechanism, comprising a rotatable rudder actuating element, a rotatable hand steering wheel, a rotary power driven unit, means coupling the power driven unit and the wheel for movement independently of the rotary movement of the wheel, and means for selectively establishing a driving connection between the rudder actuating element and the steering wheel and power driven unit upon movement of the wheel and unit together in either of two directions.

17. A ship steering mechanism, comprising a rotatable rudder actuating element, a rotatable hand steering wheel, means supporting the steering wheel for reciprocal movement on its rotary axis, means supporting the power driven unit for reciprocal movement in a path paralleling said axis, a coupling means between the power unit and wheel whereby reciprocal movement of the wheel will impart corresponding movement to the unit, and means for establishing a driving connection between the wheel and the rudder actuating element upon movement of the wheel and unit in one direction and for disestablishing said operative connection and establishing an operative connection between the unit and the rudder actuating element upon movement of the wheel and unit together in the opposite direction.

18. A ship steering mechanism as set forth in claim 16 in which the power driven unit is fluid operated, and means for controlling the direction of rotation of the power driven unit.

19. A ship steering mechanism as set forth in claim 16 in which the power driven unit is fluid operated, and means for automatically shutting off the flow of operating fluid to the power driven unit upon rotation of the rudder actuating element beyond a predetermined extent.

ARNOLD V. WALKER.